July 23, 1946.   G. P. BOSOMWORTH   2,404,582
APPARATUS FOR MAKING SHEET MATERIAL
Filed Feb. 9, 1944   2 Sheets-Sheet 1

Inventor
GEORGE P. BOSOMWORTH
By
Attorneys

July 23, 1946.  G. P. BOSOMWORTH  2,404,582
APPARATUS FOR MAKING SHEET MATERIAL
Filed Feb. 9, 1944  2 Sheets-Sheet 2
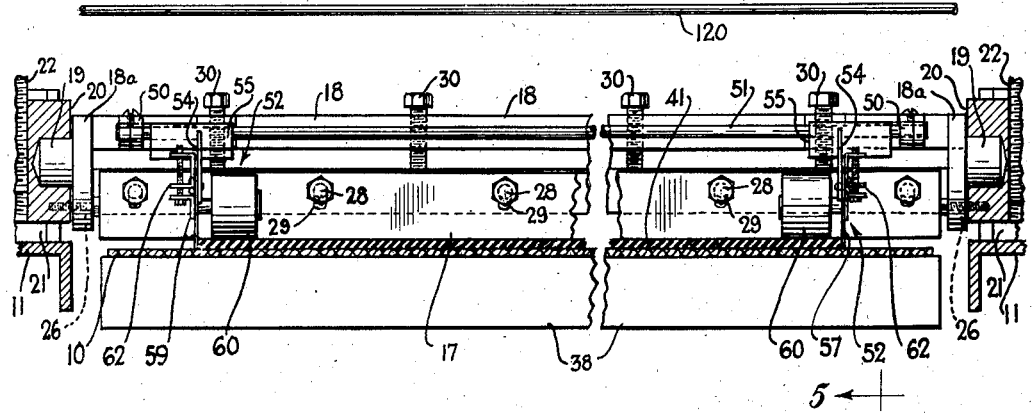
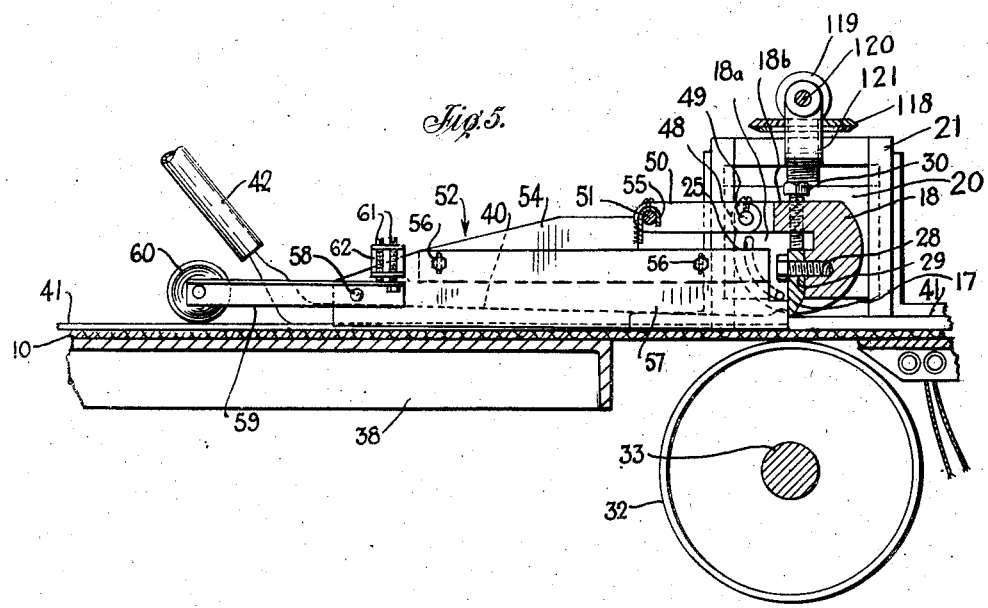
INVENTOR
GEORGE P. BOSOMWORTH
BY
ATTORNEYS Patented July 23, 1946

2,404,582

UNITED STATES PATENT OFFICE 2,404,582

APPARATUS FOR MAKING SHEET MATERIAL

George P. Bosomworth, Akron, Ohio, assignor to The Firestone Tire & Rubber Company, Akron, Ohio, a corporation of Ohio Application February 9, 1944, Serial No. 521,729

14 Claims. (Cl. 18—15)

This invention relates to apparatus for making sheet material, and more especially it relates to improved apparatus for the manufacture of continuous rubber sheeting in single ply or in laminated form.

Rubber sheeting may be made from compounded masticated rubber or from an aqueous dispersion of rubber, such as rubber latex. Unvulcanized masticated rubber is a relatively stiff plastic which readily may be sheeted to any thickness on the usual calender. For many purposes however, such as for hospital sheeting, it is desirable to form the sheeting from rubber latex, which rubber has better aging qualities and other desirable characteristics. Because of its extreme fluidity, considerable difficulty is encountered in forming continuous sheeting from rubber latex since conventional sheeting methods cannot be employed. Prior to the present invention one method of making rubber sheeting from latex was to pass a continuous conveyor through a tank of latex to deposit a thin film of a few thousandths of an inch thickness on the conveyor, drying the film, and then repeating the operation a great number of times to obtain a deposit of desired thickness before removing the film from the conveyor. The method not only required considerable time, but the sheet material produced was not of uniform thickness.

In another process, a thin film of latex was continuously deposited and dried upon the conveyor in the manner previously described, then was progressively stripped from the conveyor and doubled and pressed upon itself to produce a laminated sheet of the desired number of plies. In still another process the latex was applied to an endless conveyor by spreading it thereon to about .004 to .008 inch thickness, then dried on the conveyor, and the operation repeated to build up a laminated sheet of the desired thickness.

In all of said methods the respective plies of deposited material were of film thickness with the result that considerable time was required in the construction of a laminated sheet of substantial thickness.

The apparatus of the present invention comprises a moving endless conveyor, a doctor blade operatively associated therewith, means for maintaining a bank or pool of fluent rubber latex on one side of said doctor blade, including lateral guides for laterally confining said bank of latex, and an oven closely adjacent the opposite side of said doctor blade for gelling and drying the composition spread upon the conveyor by said blade. An important feature of the invention is the construction and arrangement of said lateral guides which are required to prevent latex from the bank or pool from seeping between the guides and the conveyor, since such latex would be coagulated and agglomerated by relative movement of the conveyor and guides and thereby produce ragged margins on the layer of material spread upon the conveyor by the doctor blade.

The chief objects of the invention are to provide improved sheet material composed of rubber deposited directly from latex; and to provide improved apparatus for continuously producing sheet material of determinate thickness from rubber latex. More specifically the invention aims to produce continuous latex sheeting of uniform thickness and smooth lateral margins. Another object is to provide in a novel manner for laterally confining a fluent pool or bank of rubber latex upon a moving conveyor contiguous with a doctor blade operatively associated therewith. Other objects will be manifest as the description proceeds.

Of the accompanying drawings:

Fig. 4 is a section of the apparatus, on a larger scale, on the line 4—4 of Fig. 3; and Fig. 5 is a section on the line 5—5 of Fig. 4.

Figure 1:
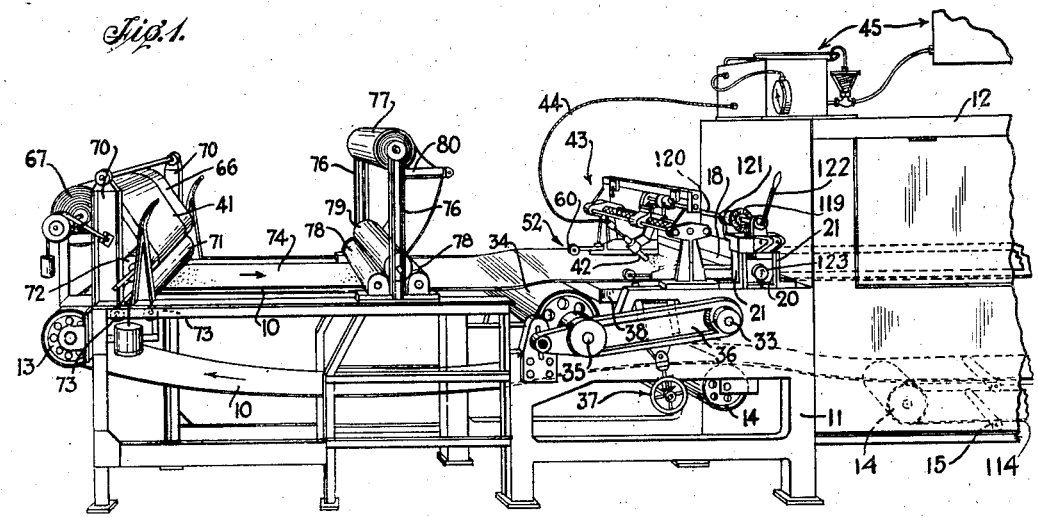
Fig. 1 is a perspective view of one end portion of apparatus embodying the invention, and the work therein.
Figure 2:
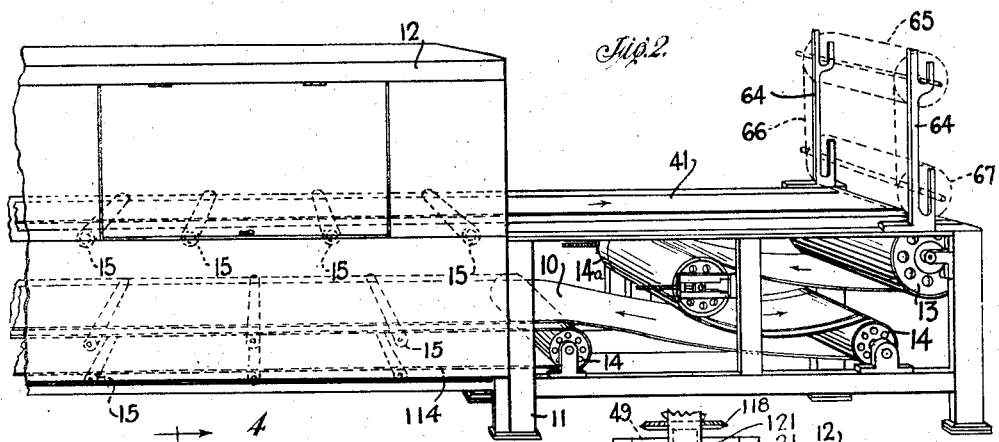
Fig. 2 is a perspective view of the opposite end portion of the apparatus.

Referring now to Figs. 1 and 2 of the drawings, there is shown an elongate endless conveyor 10 upon a surface of which one or more layers of fluent viscous composition such as rubber latex may be spread in the manufacture of sheet material. The conveyor 10 may be composed of sheet metal, such as aluminum, or it may be composed of fabric, and its surface may be treated, as by waxing, to facilitate removal of the material spread thereupon. For supporting said conveyor an open framework 11 is provided, and supported by said framework, intermediate the ends thereof, is an elongate housing or oven 12 through which the intermediate region of the upper reach and lower reach of the conveyor pass the oven enclosing the major portion of the conveyor, leaving but minor portions of the conveyor exposed at opposite ends thereof. The conveyor is supported at its respective ends exteriorly of the oven upon pulleys 13, 13, one of which is driven by any suitable means (not shown) for the purpose of impelling or driving the conveyor in the direction indicated by the arrows in the drawings. The lower reach of the conveyor is supported upon a plurality of idler rollers or sheaves 14, 14 that are journaled in suitable brackets that are mounted upon the framework 11 or which are mounted within the oven 12. Two of the rollers 14 support an endless canvas belt 114, the major portion of which is located in the lower portion of the oven 12, the lower reach of the conveyor 10 resting upon the said belt 114 so that any material deposited upon the said conveyor 10 will not be marred. The upper reach of the conveyor 10 and both reaches of the belt 114 are supported upon a series of smaller, more closely spaced, idler rollers 15, 15 located within the oven. The conveyor 10, at one end of the apparatus, is disposed in a reverse loop, and located in said loop is an adjustable idler roller 14a, Fig. 2, that is utilized to maintain the conveyor in taut condition. Preferably the roll 14a is cloth covered so as not to mar any sheet material on the conveyor 10, and so as not to adhere to material deposited thereon, which material may be tacky. The feature of feeding the lower reach of the conveyor 10 back through the oven 12 conserves heat in the conveyor and expedites the heat treatment of the rubber composition deposited thereon. Furthermore, less of the conveyor is exposed to the atmosphere and there is less dust from the atmosphere collected thereon and on the material carried thereby, with the result that improved cohesion of superposed layers of material is achieved.

Figure 3:
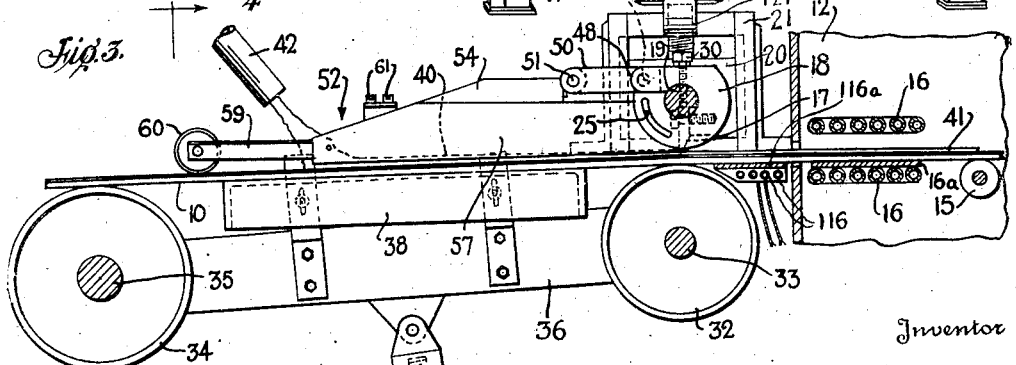
Fig. 3 is a fragmentary side elevation of the apparatus, and the work therein, on a larger scale, showing the doctor blade and structure adjacent thereto.

Within the oven 12 are suitable heating means for progressively gelling, vulcanizing and for drying sheeted latex rubber composition that may be spread upon the surface of the conveyor or which may be fabricated thereon, the atmosphere within the oven being humidified to prevent surface cracking of the composition. To expedite gellation of the rubber composition, suitable steam-heated coils 16, 16 are located within the oven immediately adjacent the work-receiving opening therein, some of said coils being located above the conveyor and some located beneath the conveyor and beneath a flat plate 16a which supports the conveyor as it passes thereover. In some instances extremely rapid gellation is desired, for example, when thick latex films of 0.050 inch or greater thickness are spread upon the conveyor, and for this purpose electrical heating elements 116, Fig. 3, are positioned beneath the conveyor 10, exteriorly of the oven in front of the work-receiving opening therein, said elements being disposed beneath a flat plate 116a which support the conveyor as it passes over said elements. It is desirable however that the elements 116 be sufficiently removed from the doctor blade of the apparatus so as not to exert a gelling effect upon the latex composition thereagainst. Gellation also may be expedited by the use of heat-sensitized latex, as subsequently will be explained.

The work-receiving end of the oven 12, as shown in the drawings, is at the left thereof and appears in Figs. 1 and 3. Immediately anterior to said receiving end of the oven, in operative association with the conveyor 10, is located means for applying successive layers or plies of rubber latex, of accurately controlled thickness, to the top face of said conveyor. Said means comprises a doctor blade 17 that extends transversely of the conveyor, above the same, said blade being secured to a lateral face of a supporting beam 18 that also spans the conveyor. Means is provided for adjusting the angular position of the beam 18 and blade 17 with relation to the conveyor 10, and also for adjusting them upwardly or downwardly to alter the proximity of the blade to the conveyor and thereby to alter the thickness of the layer of latex spread upon said conveyor. To this end the beam 18 has its opposite ends formed with respective axially extending trunnions 19 that are journaled for rotative movement in respective slide-blocks 20, the latter being mounted for vertical movement in suitable slide-brackets 21, Figs. 1 and 4, that are mounted upon the framework 11 at opposite sides thereof. Respective adjusting screws 22 are threaded vertically through the slide-blocks, the arrangement being such that the rotation of said screws, in unison, will raise or lower the slide-blocks 20 and with them the beam 18 and doctor blade 17. For turning the adjusting screws 22 in unison, each of said screws has the upper end thereof provided with a bevel gear 118, the latter being meshed with respective bevel gears 119 that are mounted upon a shaft 120. The shaft 120 spans the conveyor 10, and is journaled at its opposite ends in bearing brackets 121 mounted atop of the slide-brackets 21. At one end the shaft 120 is provided with a hand-crank 122 by which it may be rotated. Mounted upon one of the slide blocks 20 is a gauge 123, Fig. 1, that engages the fixed framework 11, the arrangement being such that said gauge will indicate the elevation of the slide-block 20 and doctor blade 17 carried thereby, and thereby to indicate the thickness of the material spread upon the conveyor by said doctor blade.

The beam 18 is a generally cylindrical structure that is flat on the side thereof that normally is disposed uppermost. The lateral face to which the doctor blade 17 is attached is flat, is disposed in a plane at right angles to the said flat top surface, and terminates short of each end of the beam to provide respective flanges 18a thereat, which flanges abut the respective slide-blocks 20, as is best shown in Fig. 4. It is sometimes desirable to rock the beam 18 on its trunnions and secure it in such position with the blade 17 tilted to a position substantially above the conveyor, as when cleaning said blade, and to this end each flange 18a is formed with an arcuate slot 25 that is concentric with the axis of the beam-trunnions 19. Threaded studs 26 are mounted in the respective slide-blocks 20 and extend laterally therefrom through said slots 25, the projecting ends of the studs being provided with the usual nuts, which, when tightened, retain the beam 18 in the tilted position mentioned, or in normal operative position shown.

The doctor blade 17 is secured to the flat lateral face of the beam 18 by a longitudinal series of set screws 28, 28 that extend through respective slots 29 in the blade, said slots being vertically arranged to enable vertical adjustment of the blade relatively of the beam. The beam comprises a portion 18b that overhangs the upper margin of the blade 17, and threaded through said overhanging portion of the beam is a series of set screws 30, 30 adapted to bear against the upper margin of the blade, in regions thereof intermediate the set screws 28. By means of the set screws 28 and 30 it is possible to apply pressure against selective regions of the blade and thus to flex and deform it in its own plane. The arrangement makes it possible to compensate for sag in the blade and irregularity in the bottom margin thereof, or irregularity of the surface of the conveyor 10.

Providing a solid support for the conveyor 10, immediately below the doctor blade 17, is a roller 32 over which said conveyor passes, said roller being journaled upon a shaft 33 that is supported adjacent its opposite ends by the framework 11. In its approach to the roller 32 the conveyor moves up an inclined plane from a supporting roller 34 at the bottom of said inclined region. The roller 34 is adjustable to vary the inclination of the conveyor between itself and the roller 32, and to this end said roller 34 is journaled on a shaft 35 supported at its respective ends by a pair of arms, such as the arm 36; the latter being disposed on the outer sides of the frame 11 and pivotally mounted on the projecting end portions of the shaft 33. Adjusting mechanism designated as a whole by the numeral 37 is provided for manual operation to adjust the angular position of the arms 36 on their pivot, and consequently the elevation of the roller 34. Between the rollers 32, 34, the conveyor 10 is solidly supported upon a flat plate 38 that is carried by the arms 36; the arrangement being such that the inclined region of the conveyor is supported at all angles of inclination.

It is on the inclined region of the conveyor 10 that there is maintained a bank or pool of viscous rubber latex composition 40, from which pool composition is spread upon the conveyor, by the doctor blade 17 as the conveyor passes thereunder, to produce the layer or sheet of material 41. The latex composition is discharged onto the conveyor 10, from a nozzle 42, at a region that is disposed somewhat anterior to the doctor blade 17 so that the pool of composition has substantial area and is enabled to spread so as to be of substantially uniform thickness at the doctor blade, whereby uniformity of thickness of the layer 41 is achieved. The feature of maintaining the pool of composition upon the inclined region of the conveyor prevents the accumulation of a thick mass of composition against the doctor blade, and the thickness of the layer 41 that is spread is not affected by hydrostatic pressure of the pool of composition. Uniformity of distribution of the viscous composition is effected by mechanism that is designated as a whole by the numeral 43, Fig. 1. Said mechanism supports the nozzle 42 and feeds it laterally back and forth across the conveyor to distribute the latex evenly over the latter. The nozzle 42 is connected by a flexible conduit 44 to a source of supply 45, the latter including means (not shown) for supplying a constant volume of latex to the nozzle. The elements designated 43 and 45 are not a part of the present invention, wherefore a fuller disclosure thereof is not believed to be necessary.

The maintenance of the pool of composition 40 on the conveyor requires that lateral guides be provided at each side so as laterally to confine the pool and thus to determine the width of the layer 41 spread upon the conveyor. To this end the blade-supporting beam 18 is provided, between its end flanges 18a and on the flat lateral face thereof, with projecting ears 48, 48 adjacent the respective ends of the beam, each of said ears supporting a laterally projecting stud 49, which studs are in axial alignment transversely of the conveyor. Mounted upon each stud 49 is a short, angularly adjustable arm 50, the free ends of said arms supporting a transverse rod 51. The latter constitutes a partial support for a pair of lateral guide members, each designated as a whole by the numeral 52.

As is best shown in Figs. 3 to 5, each lateral guide member 52 comprises a main plate 54 that is provided with a hook-like formation 55 that engages with the rod 51 to be supported thereby. Adjustably secured to the main plate 54 by bolts 56, 56 is a secondary or guide plate 57 having its lower margin disposed in determinate proximity to the conveyor 10, as presently will be explained, and having one end thereof abutting the doctor blade 17. Pivotally attached at 58 to the other end portion of the guide plate 57 is an extension or arm 59 that extends beyond the end of said plate 57 and has a supporting roller 60 journaled at its outer or free end, said roller extending laterally of the arm. At its inner end adjacent its pivot point 58, the arm 59 is engaged by a pair of adjusting screws 61 that are threaded through an overhanging bracket 62 carried by the guide plate 57. The arrangement is such that by means of the screws 61 the angular relation of the guide plate 57 and its extension 59 may be varied. As shown in the drawings, the rollers 60 are on the confronting sides of the extension arms 59, so that they will ride upon the layer of composition 41 if the latter remains on the conveyor while the conveyor makes more than one traverse past the doctor blade 17, as in the making of multiply sheeting. However, if the layer spread on the conveyor is to be removed therefrom as soon as it passes from the oven 12, the guide members 52 may be transposed, if desired, since then the rollers 60 ride upon the bare conveyor.

An important feature of the invention, made possible by the adjustable mounting of the lateral guides 52, is the position of the bottom margin of each guide plate 57 with relation to the surface of the conveyor 10, or the surface of the sheet material 41 when laminated sheeting is being produced. As is best shown in Fig. 5, the bottom margins of the guide plates 57 are spaced from the surface of the conveyor, and such spacing varies from a very slight clearance at the ends of the plates nearest the doctor blade, to a somewhat greater clearance at the opposite ends of the plates, the clearance, however, being substantially less than the thickness of the sheet 41 immediately posterior to the doctor blade. For example, the doctor blade may be positioned .040" from the conveyor, the adjacent ends of the guide plates positioned .002" from the conveyor, and the opposite ends of the guide plates positioned .010" from the conveyor. Experience has shown that when the lateral guide plates are spaced from the conveyor to the extent set forth, the fluent latex composition of the pool 40 thereof does not seep between the bottom of the blades and the conveyor, which phenomenon is believed to be the result of the surface tension of the composition. Thus there is no coagulation of the latex resulting from the pinching thereof between the guide plates and conveyor, and the margins of the sheet or layer 41 are regular and trim. This is so also in those cases where the conveyor makes several traverses through the apparatus, as in the manufacture of laminated sheeting, since the rollers 60 will ride upon the sheeting plies on the conveyor; and the guide will be elevated as the beam 18 is lifted to elevate the doctor blade 17. The arrangement is such as to maintain the bottom margins of the guide plates 57 at all times in determinate spaced relation to the work, notwithstanding shrinkage in the thickness of the work as it is dried during passage through the oven 12.

In the manufacture of single-ply sheeting, the layer 41 is stripped from the conveyor 10 immediately after it leaves the oven 12. To this end a pair of suitable upright brackets 64, 64, Fig. 2, are mounted upon the framework 11, at the end thereof beyond said oven, and on opposite sides of the conveyor 10. The brackets 64 are adapted to support, at a position above the conveyor, a roll 65 of liner 66, and to guide a wind up roll 67 that rests upon the conveyor. The roll 66 is frictionally driven by the conveyor to strip the sheet 41 therefrom and wind it about itself, the liner 66 withdrawn from the roll 65 thereof being interposed between the convolutions of the sheet material 41. In the manufacture of laminated sheeting, the conveyor makes several passes through the apparatus to build up a plural-ply sheet that eventually is stripped from the conveyor in the manner described and by the apparatus just described. In cases where it may be desirable for the sheet 41 to remain on the conveyor for a slightly longer period, it will be stripped from the conveyor by a take-off device presently to be described.

When producing laminated sheeting of greater than average thickness, a somewhat different procedure may be employed by the apparatus. In such case there first is produced a laminated sheet of half the number of plies desired in the finished sheet. The first-produced laminated sheet is stripped from the conveyor and wrapped in a liner in the manner hereinbefore described. The speed of the conveyor and the temperature of the oven 12 are regulated and coordinated so that the laminated sheet is about 90% to 95% dry, the remaining moisture therein causing the surface thereof to be somewhat tacky. Thereafter, another laminated sheet is built up on the conveyor, and when it has attained the desired number of plies, the first-constructed sheet is progressively fed back onto the conveyor whereon it adheres to the last-constructed sheet thereon, and then both sheets are removed from the conveyor. The operations of assembling the two laminated sheets and then removing them from the conveyor are effected at the left hand end of the conveyor, the apparatus employed being shown in Fig. 1.

Referring to Fig. 1 of the drawings, it will be seen that the end portion of the framework 11 has a pair of brackets 70, 70 rising therefrom at opposite sides of the conveyor 10, said brackets comprising means for rotatably supporting a roll 67 of liner and sheet material, and means for guiding a pressure roll 71 that rests upon the conveyor 10 and a liner rewind roll 72 that rests upon the pressure roll 71. A pair of cradle rolls 73, 73 disposed in spaced apart relation parallel to the pressure roll 71 support the conveyor 10 below said roll 71, the arrangement enabling the conveyor to sag slightly between said rolls 73 whereby the pressure roll has greater area of contact with the conveyor and sheet material thereon. In operation, the liner 66 and laminated sheet 41 are withdrawn from the roll 67 and pass over the liner rewind roll 72 whereon the liner separates from the sheet 41 and is rewound, the latter passing around and under the pressure roll 71 to be pressed and adhered thereby to the last constructed laminated sheet thereon, the composite laminated sheeting being shown at 74 in the drawings. The conveyor 10 frictionally drives the pressure roll 71 to provide the pull for withdrawing the material from the roll 67 of liner and sheeting.

For withdrawing the composite sheet 74 from the conveyor 10, the framework 11 has a pair of brackets 76, 76 rising therefrom on opposite sides of said conveyor, said brackets being located in the horizontal region of the conveyor between the brackets 70 and the inclined region of the conveyor which begins at the supporting roller 34. Said brackets comprise means for rotatably supporting a liner-supply roll 77, and include guides for a pair of laterally spaced apart cradle rolls 78, 78 that span the conveyor and rest upon the work thereon so as to be frictionally driven thereby, said cradle rolls supporting a work-rewinding roll 79 and frictionally driving the same. The brackets 76 include guide means for the roll 79, and also carry a guide-rod 80 over which liner from the roll 77 passes as it is withdrawn therefrom.

In operation, the composite sheet 74 is carried beneath the two cradle rolls 78 so as to drive the same and the wind-up roll 79 supported thereby. The sheet 74 is stripped from the conveyor 10 by the second cradle roll 78, and passes partly about the same, thence passing to the rewinding roll 79 to be wound thereabout with a liner withdrawn from the roll 77 thereof. It will be obvious that the device for withdrawing the composite sheet 74 from the conveyor is equally well adapted for withdrawing the sheet 41 therefrom, while said sheet is in single-ply form or when it is in laminated form.

By means of the apparatus described it is possible to produce improved latex rubber sheeting varying from the relatively thin material employed for hospital sheeting to the relatively thick, laminated material employed in the manufacture of self-sealing liquid fuel cells. Best results are obtained in the manufacture of hospital sheeting when a substantially non-heat-sensitive latex is employed, such as the following:

| | Parts |
|---|---|
| Latex (60%) | 166 |
| Water | 3.3 |
| Zinc oxide dispersion (50%) | 6.5 |
| Sulfur dispersion (50%) | 3.0 |
| Sodium diethyl dithiocarbamate solution (25%) | 4.0 |
| Sodium silicate solution (40%) | 3.3 |

Although this composition does not immediately gel upon entering the oven, the relative thinness of the sheet (about .015″) and the surface tension of the composition combine to prevent appreciable spreading and thinning of the sheet at the lateral margins thereof. In the manufacture of rubber sheeting for fuel cells, which comprise a plurality of plies, straight 60% latex generally is used, without the addition of gelling or vulcanizing agents. In such case it is possible to spread a layer of latex as thick as .040 inch without appreciable thinning at the margins thereof.

When spreading very thick films (.050 inch or more) it is desirable to use heat-sensitized latex, and in some cases to employ the electrical heating elements 116. Heat sensitive latex such as the following has been found to give satisfactory results.

| | Parts |
|---|---|
| Latex (60%) | 166 |
| Water | 12.5 |
| Zinc oxide dispersion (50%) | 6.5 |
| Sulfur dispersion (62.5%) | 4.0 |
| Sodium diethyl dithiocarbamate solution (25%) | 2.0 |
| Darvan No. 1 solution [1] (50%) | 5.0 |
| Calcium sulfate dispersion (66%) | 12.4 |

[1] Sodium salt of polymerized alkyl-aryl-sulfonic acids.

The apparatus also is adaptable for use in the manufacture of sheeting of sponge or cellular rubber. In this case the latex is beaten or frothed, after which a gelling agent is added. Because the froth is less fluent than unfrothed latex, it may be spread on the conveyor to greater thickness. Thus it is possible to operate the apparatus with a blade setting of $\frac{1}{16}$ inch to produce sponge sheeting having an ultimate thickness of $\frac{3}{32}$ inch.

From the foregoing it will be apparent that the invention provides in an improved manner for the manufacture of latex rubber sheeting, both single ply and laminated, and achieves the other objects set out in the foregoing statement of objects.

In addition to the manufacture of latex sheeting, the invention may be utilized without material alteration for applying a coating of latex rubber to fabric, and the latter may be untreated, or it may have a skim coating of rubber on one or both sides thereof. To apply latex to fabric it is only necessary to run the latter through the apparatus while supported upon the conveyor 10.

Modification may be resorted to without departing from the spirit of the invention, or the scope thereof as defined by the appended claims.

What is claimed is:

1. Apparatus for making sheet material, said apparatus comprising an endless conveyor and means for driving the same, a doctor blade spanning a horizontally disposed reach of the conveyor, a vertically adjustable beam spanning the conveyor and to which the doctor blade is attached, means for maintaining a pool of fluent composition on the conveyor against one side of the doctor blade, lateral guides for said pool of composition to limit lateral spreading thereof, means on the beam constituting pivotal support for one end portion of each of said guides, and means carried by the other end portion of each guide adapted for rolling engagement with the conveyor to assist in the support of the guides.

2. A combination as defined in claim 1 whereof the rolling means carried by each guide projects laterally thereof so that upon transposition of the lateral guides said means will roll upon sheet material that may be on the conveyor.

3. A combination as defined in claim 1 in which the means on the beam that constitutes a pivotal support for one end portion of the guides is adjustable relatively of the beam.

4. Apparatus for making sheet material, said apparatus comprising an endless conveyor and means for driving the same, a doctor blade spanning a horizontally disposed reach of the conveyor, a vertically adjustable beam spanning the conveyor and to which the doctor blade is attached, means for maintaining a pool of fluent composition on the conveyor against one side of the doctor blade, angularly adjustable arms projecting laterally from said beam over said pool, a supporting rod carried by said arms at the free end thereof, lateral guides for said pool of composition to limit lateral spreading thereof, and means on said guides adjacent one end thereof pivotally engaging said supporting rod whereby the latter constitutes a partial support for the guides.

5. Apparatus for making sheet material, said apparatus comprising an endless conveyor and means for driving the same, a doctor blade spanning the conveyor, a vertically adjustable beam spanning the conveyor to which the doctor blade is adjustably attached, means for maintaining a pool of fluent composition on the conveyor contiguous with one side of the doctor blade, and lateral guides for said pool of composition to limit lateral spreading thereof, each of said guides comprising a main plate that is pivotally connected to said beam, a guide plate removably and adjustably secured to said main plate, and means carried by said guide plate adapted for rolling engagement with the surface of the conveyor.

6. A combination as defined in claim 4 wherein the last mentioned means comprises a roller, and an arm to the free end of which the roller is journaled, the arm being connected to the guide plate and constituting an extension thereof.

7. A combination as defined in claim 4 wherein the last mentioned means comprises a roller, an arm to the free end of which the roller is journaled, the arm being pivotally connected at its opposite end to the guide plate, and means on the latter for adjusting the angular position of said arm with relation thereto.

8. Apparatus for making sheet material, said apparatus comprising an endless conveyor and means for driving the same, a doctor blade spanning the upper reach of the conveyor, a beam spanning the conveyor and having the doctor blade attached thereto, the respective ends of said beam being formed with trunnions, slide blocks at opposite sides of the conveyor in which said trunnions are journaled, means for adjusting the elevation of the slide blocks in unison, flanges formed on the opposite end portions of the beam, which flanges are formed with arcuate slots that are concentric with the trunnions of the beam, and fastening means that extend through said slots and adjustably secure said flanges to the slide blocks for retaining the beam in determinate angular relation to the conveyor.

9. In apparatus for the continuous manufacture of sheet rubber from rubber latex, the combination of a movable supporting surface having a region inclined upwardly in the direction of normal movement of said surface, means for delivering latex composition to said inclined region, a doctor blade operably associated with said surface at a point above the point at which said latex composition is delivered to said surface adapted to spread said latex composition and produce a layer of said composition of uniform thickness, lateral guides positioned adjacent said inclined region for limiting the lateral spreading of said layer of latex composition, the bottom margins of said guides being spaced from said supporting surface, the spacing of the margins from said supporting surface being sufficient only to prevent pinching of the latex composition between said guides and said surface while preventing the flow of latex composition between said guides and said surface due to surface tension of the composition, the spacing between said guides and said surface also progressively increasing longitudinally thereof in a direction away from a point adjacent said doctor blade and opposite to the direction of normal movement of said surface.

10. The combination as set forth in claim 9 wherein the margins of said guides are spaced approximately .002 of an inch from said movable surface at a point adjacent said doctor blade, and are spaced approximately .010 of an inch from said movable surface at the opposite ends of said margins and said doctor blade is spaced approximately .040 of an inch from said movable surface.

11. In combination with the apparatus set forth in claim 9, means carried by the ends of said guides remote from said doctor blade adapted for rolling engagement with said movable supporting surface to assist in the support of said guides.

12. In combination with the apparatus set forth in claim 9, an oven immediately adjacent said doctor blade through which said supporting surface is adapted to move for treating said layer of latex composition and converting it to rubber.

13. Apparatus for continuous manufacture of sheet rubber from rubber latex composition, said apparatus comprising an endless conveyor, a doctor blade spanning a substantially horizontally disposed reach of said conveyor, vertically adjustable supporting means spanning said conveyor and to which said doctor blade is attached, means for maintaining a pool of said latex composition on said conveyor against one side of said doctor blade, lateral guides for said pool of composition to limit lateral spreading thereof, means on said doctor blade supporting means constituting pivotal support for one end of each of said guides and means carried by the other end of said guides adapted for rolling engagement with said conveyor to assist in the support of said guides.

14. In apparatus for making sheet material, the combination of a horizontally arranged endless conveyor and means for driving the same, a doctor blade operatively associated with the upper reach of the conveyor in spaced relation to one end thereof, means for maintaining a bank or pool of fluent composition of uniform thickness against the front of the doctor blade to be spread by said blade upon the conveyor passing thereunder, lateral guides for said pool of material to prevent lateral spreading thereof, an oven having its receiving end located immediately adjacent and behind the doctor blade and through which the conveyor passes to effect gelling and substantial drying of the sheet of composition spread thereon, means for progressively placing a pre-formed sheet on the conveyor in superposed relation to a sheet of material spread thereon, and take-off means for removing both sheets as a unit from the conveyor.

GEORGE P. BOSOMWORTH.